Aug. 6, 1957

W. E. ANDERSON 2,801,514

DUMP BRAKE LOCKING DEVICE

Filed Nov. 15, 1955

Wayne E. Anderson
INVENTOR.

BY *Clarence A. O'Brien*
*and Harvey B. Jackson*
Attorneys

Aug. 6, 1957 W. E. ANDERSON 2,801,514
DUMP BRAKE LOCKING DEVICE
Filed Nov. 15, 1955 2 Sheets-Sheet 2
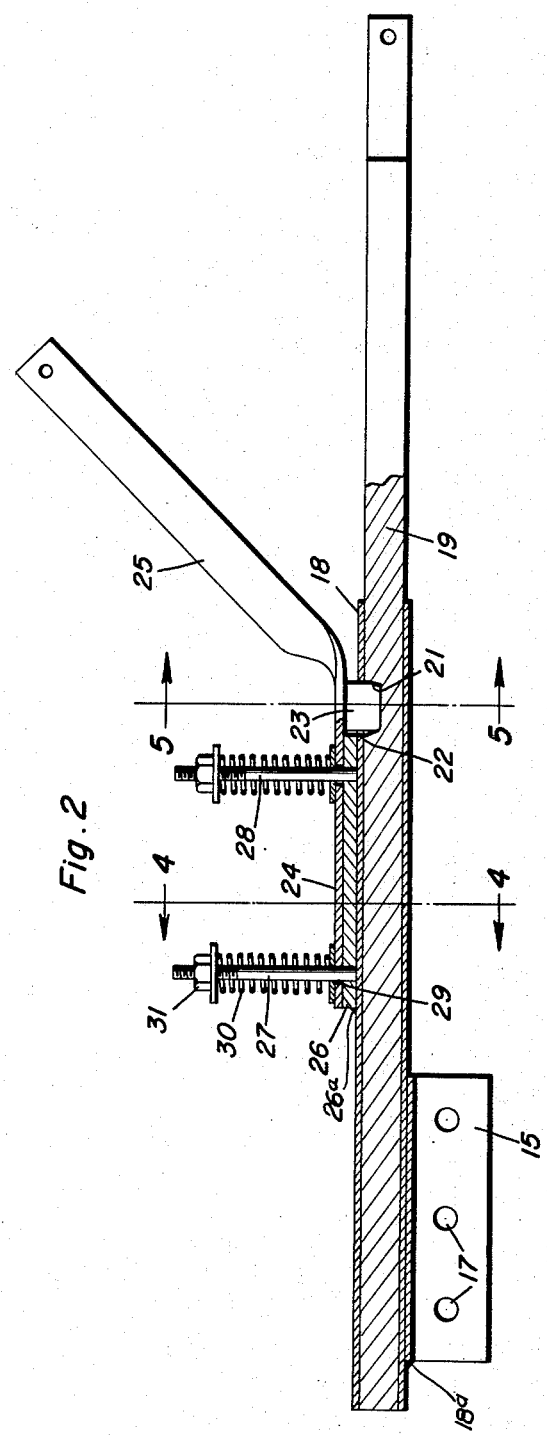
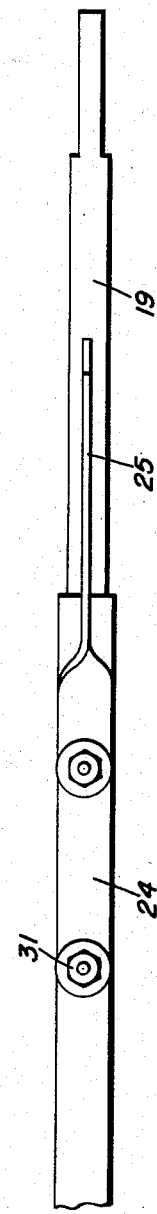
Wayne E. Anderson
INVENTOR.

United States Patent Office 2,801,514
Patented Aug. 6, 1957

2,801,514

DUMP BRAKE LOCKING DEVICE

Wayne E. Anderson, Iroquois, S. Dak.

Application November 15, 1955, Serial No. 546,888

2 Claims. (Cl. 56—393)

When the present invention relates to new and useful improvements in dumping hay rakes and more particularly to means for locking the rake in its lowered raking position. An important object of the invention is to provide a lever operated by a rope from a position forwardly of the rake to raise the rake into a dumping position and providing the lever with a locking bar which is slidably supported on the rake and engaged by a locking dog carried by a second lever which is also actuated from a position forwardly of the rake to release the locking bar.

Another object of the invention is to provide pivoted guide means for the locking bar to compensate for the tilting movement of the latter during actuation thereof by the lever.

A still further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged elevational view, with parts broken away and shown in section of the guide sleeve for the locking bar;

Figure 3 is a top plan view thereof; and

Figure 4:
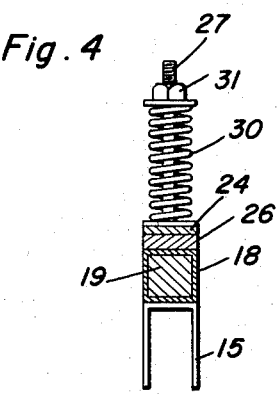
Figure 5:
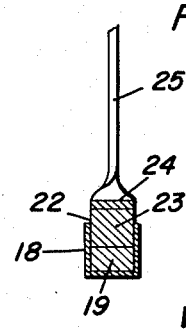

Figures 4 and 5 are transverse sectional views taken respectively on the lines 4—4 and 5—5 of Figure 2.

Referring now to the drawings in detail wherein for the purpose of illustration I have disclosed a preferred embodiment of the invention, the numeral 5 designates one of the wheels of a conventional type of dumping rake and which supports an axle 6 to which angle iron member 7 is welded as shown at 7a or otherwise suitably secured and with the angle iron member arranged to provide a rearwardly projecting horizontal flange 8 and a downwardly projecting flange 9. The upper end portions of arcuate rake teeth 10 are welded as shown at 10a or otherwise suitably secured to the horizontal flange 8 of said angle iron member for raising and lowering the teeth by a rocking movement of said angle iron member.

The rake frame is designated generally at 11 and from which the tongue 12 projects forwardly and hook-shaped arms 13 project rearwardly from the frame 11 and are pivoted at their rear ends to the downwardly projecting flange portion 9 of the angle iron member 7, to support the frame on the axle.

A plate 14 is welded as shown at 14a or otherwise suitably secured on top of frame 11 in a longitudinally extending edgewise upstanding position and a channel member 15 is inverted on top of the plate 14 and pivotally secured thereto by a transverse pin 16 selectively engaged in a row of openings 17 in the channel member for adjustment of the latter longitudinally on the frame. A guide sleeve 18 of square shape in cross section is welded as shown at 18a or otherwise suitably secured on top of the channel member 15 and in which a locking bar 19 is slidable. The locking bar projects rearwardly beyond the sleeve 18 and is pivoted to the lower portion of an upstanding lever 20 which is welded as shown at 20a to the rear edge portion of the horizontal flange 8 of the angle iron member 7.

The upper surface of locking bar 19 is formed with a notch 21 adapted for aligning with an opening 22 in the top of the guide sleeve 18 for lockable engagement of a locking dog 23 in the notch. The locking dog projects downwardly at the underside of a strap metal plate 24 which is formed at its rear portion with an upwardly and rearwardly inclined lever 25. A reinforcing plate 26 is welded as shown at 26a or otherwise suitably secured on top of the guide sleeve 18 and which are provided with front and rear upstanding threaded studs 27 and 28. The studs 27 and 28 project upwardly through relatively large openings 29 in the plate 24 to permit tilting movement of the plate. A coil spring 30 is mounted on each of the upstanding studs and is held under tension by a nut 31 threaded on the upper end of the stud and with the lower end of the spring bearing against the plate 24.

Ropes 32 and 33 are connected to the upper end portions of levers 20 and 25 respectively and extend in a direction forwardly of the rake for manual operation from a tractor or other towing vehicle for the rake. The ropes 32 and 33 may be connected to each other for simultaneous actuation, if desired.

Figure 1:
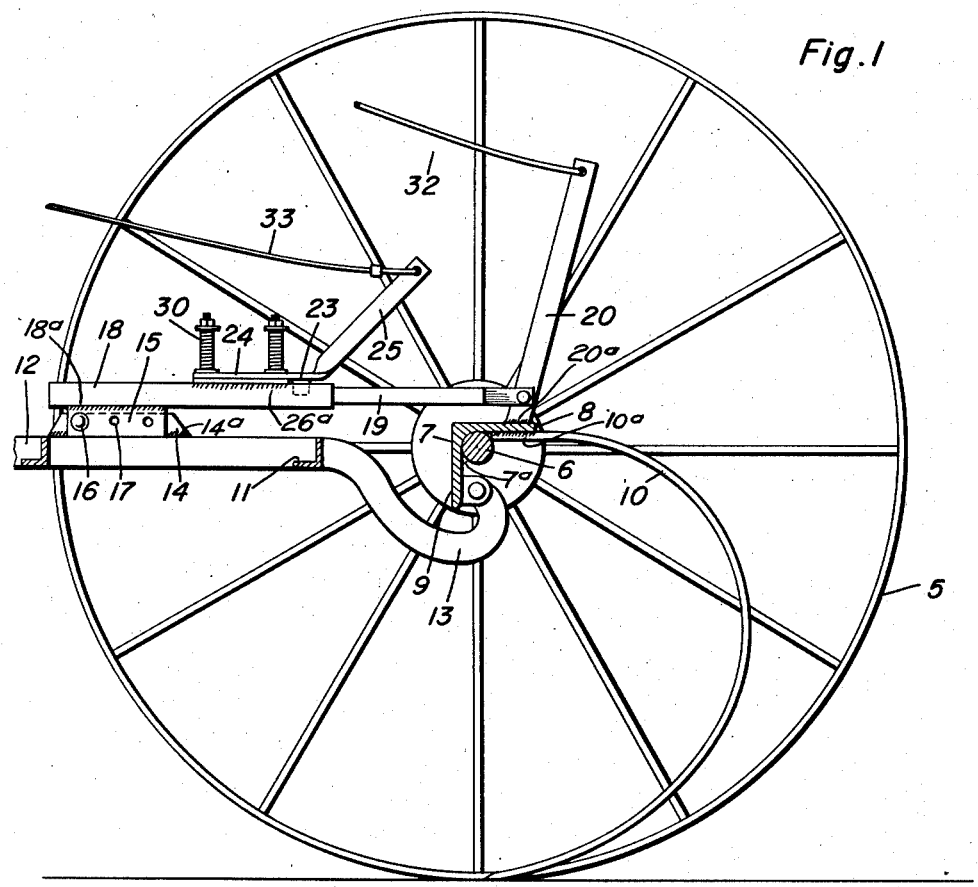
Figure 1 is a side elevational view of the locking mechanism for the rake and with parts broken away and shown in section.

In the operation of the device the springs 30 hold the locking dog 23 downwardly in engaged position in the notch 21 of locking bar to lock the rake teeth 10 in their lowered raking position, as shown in Figure 1 of the drawings.

When it is desired to dump the load, the ropes 32 and 33 are pulled to release dog 23 and to rock the angle iron member 7 in a direction to lift the rake teeth. When the levers 20 and 23 are released the teeth gravitate into their lowered position and the springs 30 automatically lock the dog 23 in the notch 21 of the locking bar 19.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is:

1. In a hayrake, a frame, an axle having an angle iron member fixed thereto for rocking movement therewith, said frame being supported by said angle iron member, a plurality of rake teeth secured to the angle iron member for raising and lowering movement by the turning of said member, a manually operated lever fixed at one end to one of the flanges of the angle iron member for rocking the latter to lift the teeth, a guide carried by the frame, a locking bar slidable in the guide and connected to the lever, and latch means lockably engaging the bar to lock the teeth in lowered position.

2. The construction of claim 1 wherein said locking bar includes a notch and said latch means comprises a pair of upstanding studs fixed to and rising from the guide and with said studs positioned one in front of the other, a manually operated lever including a plate at one end portion having a pair of openings in which the studs are slidably received, said openings being of a diameter substantially greater than the diameter of the studs for tilting movement of the plate on the studs, spring means on the studs and tensionally urging the lever downwardly on top of the guide, and a locking dog projecting downwardly at the underside of the plate and engaged in said notch.

References Cited in the file of this patent

UNITED STATES PATENTS

| | | |
|---|---|---|
| 254,787 | Auchey | Mar. 14, 1882 |
| 453,694 | Fowler | June 9, 1891 |
| 2,488,061 | Herman | Nov. 15, 1949 |
| 2,607,181 | Huseby | Aug. 19, 1952 |